(12) United States Patent
Alexandre et al.

(10) Patent No.: US 7,733,954 B2
(45) Date of Patent: Jun. 8, 2010

(54) METHOD OF CODING A VIDEO IMAGE STREAM WITH A VIEW FOR SUBSEQUENT RECODING USING THE SAME TYPE OF CODE

(75) Inventors: Patrice Alexandre, Cesson Sévigné (FR); Jean Chatel, Rennes (FR)

(73) Assignee: Thomson Licensing, Boulogne-Billancourt (FR)

( * ) Notice: Subject to any disclaimer, the term of this patent is extended or adjusted under 35 U.S.C. 154(b) by 2126 days.

(21) Appl. No.: 10/296,069

(22) PCT Filed: May 9, 2001

(86) PCT No.: PCT/FR01/01404

§ 371 (c)(1),
(2), (4) Date: Nov. 21, 2002

(87) PCT Pub. No.: WO01/93594

PCT Pub. Date: Dec. 6, 2001

(65) Prior Publication Data

US 2004/0101041 A1    May 27, 2004

(30) Foreign Application Priority Data

May 26, 2000   (FR) .................................. 00 06733

(51) Int. Cl.
*H04N 7/26* (2006.01)

(52) U.S. Cl. .............................. 375/240.01; 375/240.12
(58) Field of Classification Search ............ 375/240.16, 375/240.02, 240.12, 240.13, 240.2, 240.22, 375/240.01
See application file for complete search history.

(56) References Cited

U.S. PATENT DOCUMENTS

| 6,088,393 A * | 7/2000 | Knee et al. ................... 375/240 |
| 6,560,282 B2 * | 5/2003 | Tahara et al. ........... 375/240.02 |
| 7,236,526 B1 * | 6/2007 | Kitamura ................ 375/240.16 |

FOREIGN PATENT DOCUMENTS

| EP | 492 528 A2 | 7/1992 |
| EP | 696 873 A2 | 2/1996 |
| EP | 823 822 A2 | 2/1998 |
| WO | WO 95/35628 | 12/1995 |
| WO | 97/40626 | 10/1997 |

\* cited by examiner

*Primary Examiner*—David E Harvey
(74) *Attorney, Agent, or Firm*—Robert D. Shedd; Paul P. Kiel; Guy H. Ericksen

(57) ABSTRACT

The invention lies within the area of image compression coding, in particular of MPEG type, which uses recoding help data. The invention affords a solution for reusing the help data selectively. To this end, the invention adjoins an electronic signature representative of the constraints of the coder. Thus, it becomes possible to determine whether the help data are reusable or not for a subsequent coding using other constraints.

12 Claims, 4 Drawing Sheets

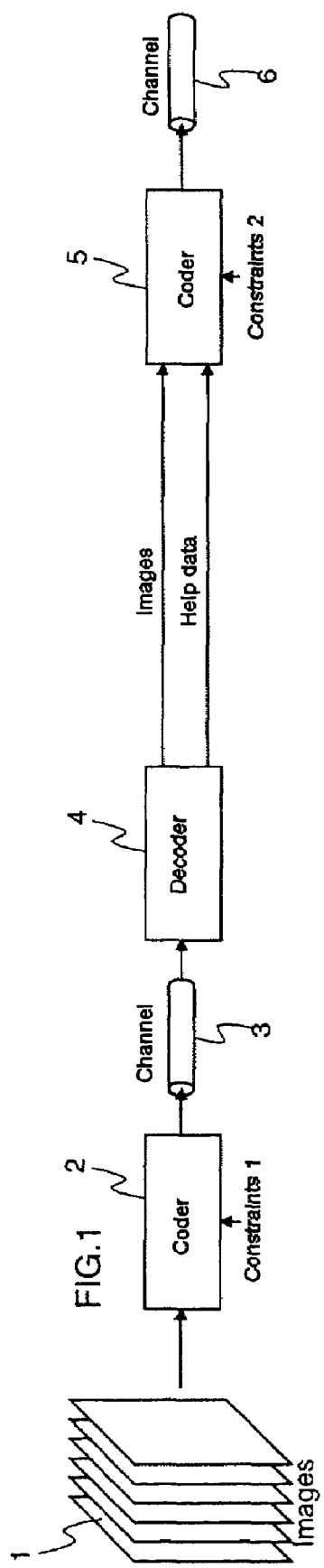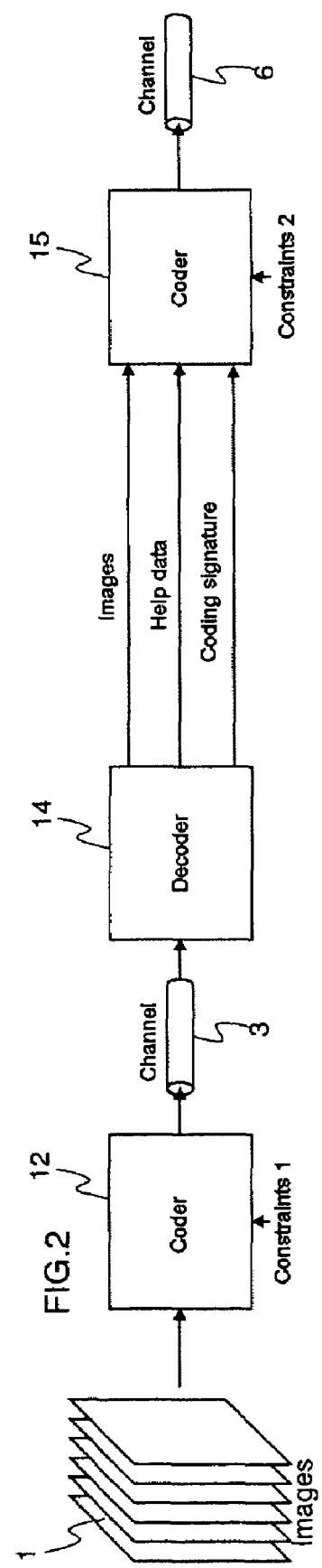

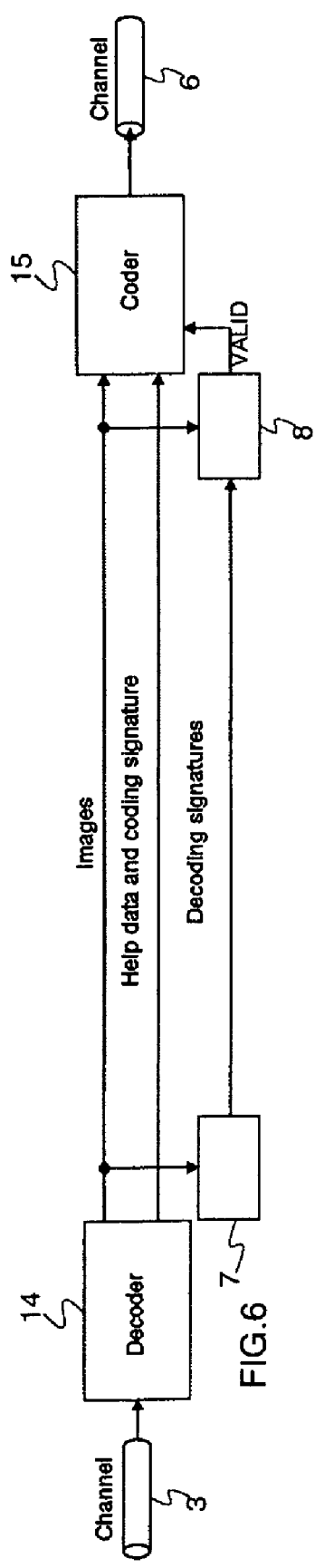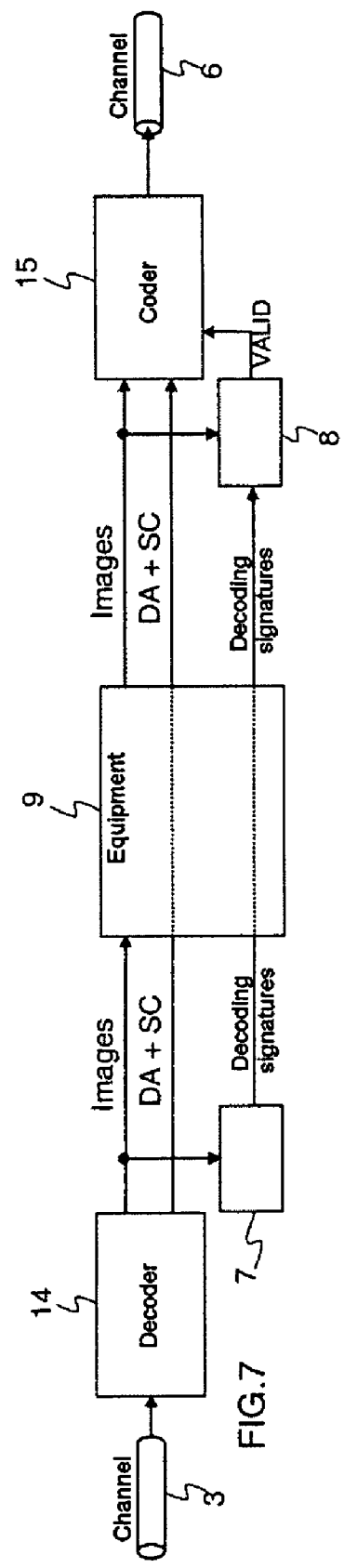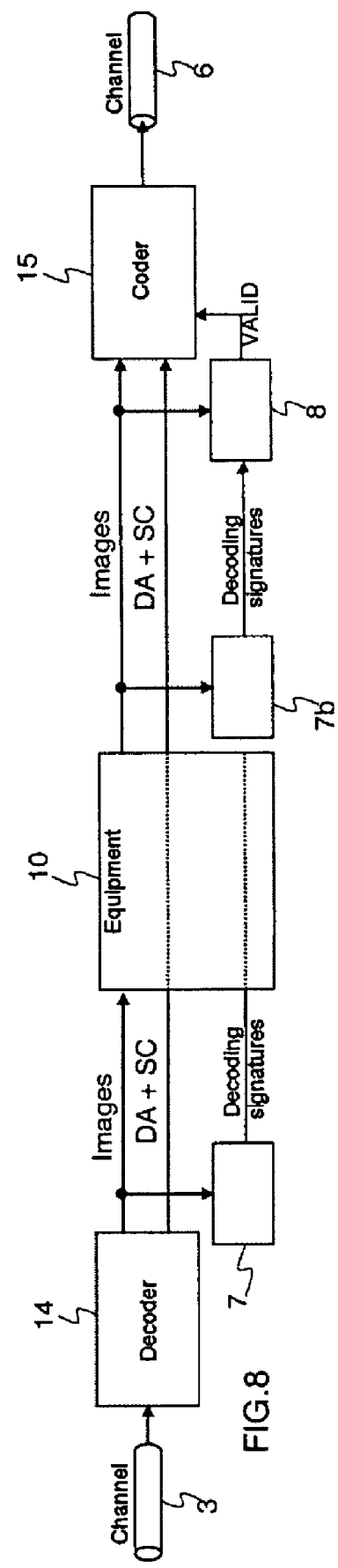

FIG.9
| Z1 | Z2 | Z3 | Z4 |
|----|----|----|----|
| Z5 | Z6 | Z7 | Z8 |
| Z9 | Z10 | Z11 | Z12 |
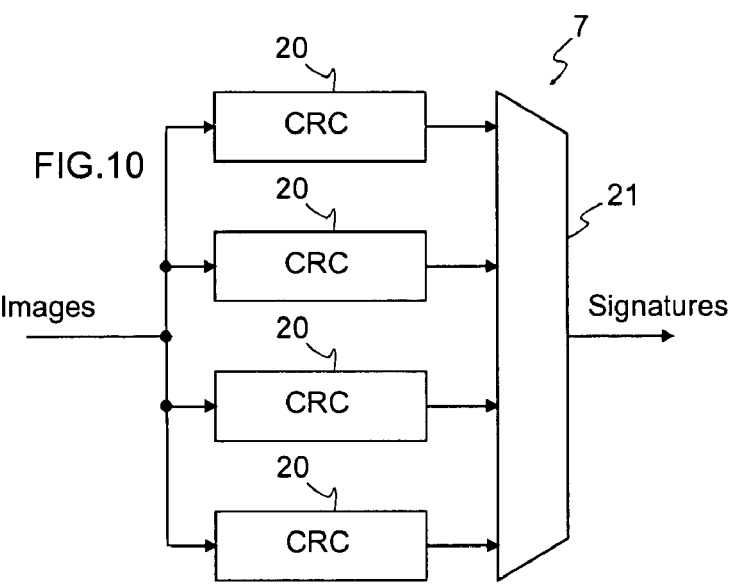
FIG.10
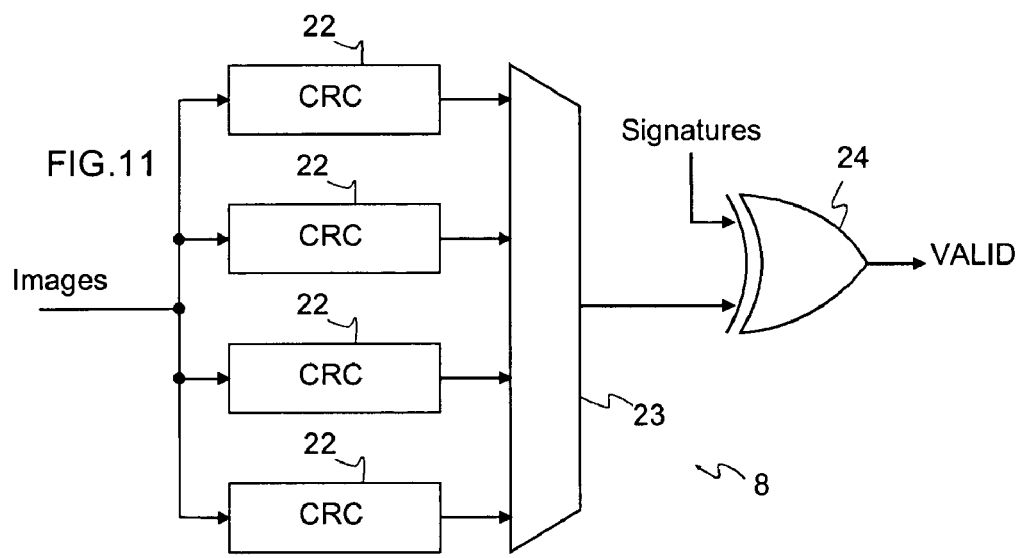
FIG.11
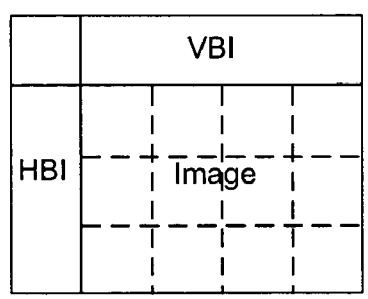
FIG.12

METHOD OF CODING A VIDEO IMAGE STREAM WITH A VIEW FOR SUBSEQUENT RECODING USING THE SAME TYPE OF CODE

This application claims the benefit under 35 U.S.C. § 365 of International Application PCT/FR01/01404, filed May 9, 2001, which was published in accordance with PCT Article 21(2) on Dec. 6, 2001 in French, and which claims the benefit of French Application No. 0006733, filed May 26, 2000.

The invention relates to a method of coding a video image stream. More particularly, the invention relates to the repetitive coding of video images with the help of a compression algorithm with information loss.

The transmission of a digital video image stream requires a considerable bit rate, of the order of 270 Mb/s for images of studio quality. Now, the transmission channels which permit such bit rates are relatively expensive for long distances. In order to be able to use transmission channels of lower capacity, it is known to resort to image compression algorithms.

Among the compression algorithms, it is known to use compression algorithms with or without information loss. The loss less algorithms carry out a coding based on the information redundancies of each image or of a plurality of images. The loss less algorithms have the advantage of not degrading the quality of the signal but have the defect of having a variable bit rate which depends on the image to be coded.

The codes with loss delete image information elements which are not normally visible and which make it possible to reduce the information to be transmitted. The codes with loss make it possible to obtain a constant or limited bit rate by varying the rate of information loss.

At present, numerous image compression algorithms with information loss are known. By way of non-limiting indication, the standards ITU-T H261 and ITU-T H263 exist for videophony, and ISO/IEC 11172 and ISO/IEC 13818 exist for television pictures, the latter being known by the name MPEG (standing for Motion Picture Expert Group).

By way of example, the present application will be based mainly on the MPEG type coding methods. Although the invention is not limited to these standards, in the subsequent description reference will mainly be made thereto.

The principle of such compression is recalled herein below.

In the video MPEG standards, compression of the video digital signals is obtained by utilizing the spatial redundancy and the temporal redundancy of the coded images.

The spatial redundancy is evaluated mainly by virtue of the succession of three operations: an operation commonly called the Discrete Cosine Transform and denoted DCT, an operation of quantizing the coefficients emanating from the DCT and a variable-length coding operation for describing the quantized coefficients emanating from the DCT.

The temporal redundancy is analysed by a motion compensation operation which consists, by translation of each block of the current image, in searching for the most similar block situated in a reference image. The analysis of the temporal redundancy leads to the determination of a field of translation vectors, which are commonly called motion vectors, as well as of a prediction error which is the difference between the signal of the current image and the signal of the image predicted by motion compensation. The prediction error is then analysed according to the principle of spatial redundancy.

MPEG coding is of predictive type. It follows that the decoding associated therewith must be regularly reinitialised so as to protect the signal against any transmission error or any signal break due to the toggling of the decoder from one program to another.

To this end, the MPEG standard provides that, periodically, the images have to be coded in spatial mode, that is to say according to a mode utilizing only spatial redundancy. The images coded in spatial mode are called INTRA images or I images.

The images coded by utilizing temporal redundancy are of two types: on the one hand, the images constructed by reference to a temporally earlier image on the basis of a forward prediction and, on the other hand, the images constructed by reference to two images, temporally earlier and later, on the basis of a forward prediction and of a backward prediction.

The coded images constructed on the basis of a forward prediction are called predicted images or P images and the coded images constructed on the basis of a forward prediction and of a backward prediction are called bi-directional images or B images.

An I image is decoded without making reference to images other than itself. A P image is decoded by making reference to the P or I image which precedes it. A B image is decoded by making reference to the I or P image which precedes it and to the I or P image which follows it.

The periodicity of the I images defines a group of images commonly denoted GOP (standing for Group Of Pictures).

Within one and the same GOP, the amount of data contained in an I image is generally greater than the amount of data contained in a P image and the amount of data contained in a P image is generally greater than the amount of data contained in a B image.

The person skilled in the art may refer to the ISO/IEC 11172 and ISO/IEC 13818 standards for the details of implementation of this type of coding. The degradation of the image brought about by the coding is not perceptible to the eye of a viewer. However, when an image sequence has undergone several decoding/coding cycles, the accumulation of information losses is such that the degradation becomes perceptible.

Televisual broadcasting requires the effecting of several coding cycles. Specifically, the studio editing work for a film or for a piece of reporting makes it necessary to code and to decode the image sequence to be coded many times, conventionally between 5 and 10 times for a piece of reporting.

Now, a problem, arising during the cascading of several decoding and coding series, is the accumulation of information losses. After ten decoding/coding cycles, the image is of mediocre quality.

To remedy this problem, it is known to use recording help data. The person skilled in the art may for example refer to the international patent applications published under the numbers WO 95/35628, WO 96/24222 and WO 98/03017 or to European patent application EP-A-0 618 734. The principle of recoding help data is the associating with each decoded image of information relating to coding parameters used during the previous coding so as to reuse these same parameters during the next coding of the image. Thus, the image information loss is limited after the first coding, thus permitting a considerable number of decoding/coding cycles while retaining good image quality.

Various possibilities of implementation are possible, some of them already being included in the SMPTE 319M, SMPTE 327M and SMPTE 329M standards. As far as MPEG coding is concerned, it is possible to reuse very many parameters. The main parameters reused are the image type which indicates whether the image undergoes intra-image coding, predictive coding or bidirectional predictive coding, and also the coding mode which indicates whether the image is coded per frame or per field. Commonly used complementary parameters are the resolution of the image (or level), the distribution of the chrominance information (or profile), the motion vectors, the quantization step sizes and the quantization matrices. Of course, all the coding parameters used (that is to say all the parameters explicitly coded in the stream) are able to be reused.

The recoding help data can be implemented in various ways. To associate the recoding help data with each image, it is known to use as channel an auxiliary sound pathway, non-significant grey level quantization bits, or the frame and/or line blanking intervals more commonly known by the acronyms VBI and HBI (standing for Vertical Blanking Interval and Horizontal Blanking Interval).

The use of help data nevertheless has a few drawbacks. When the image stream is modified, the help data are not modified accordingly. According to the technique of implementation, the recoding help data are either deleted or retained according to the processing performed. If the implementation systematically erases the help data, it becomes impossible to reuse the information although some of it is usable. By way of example, the image type and the coding mode are items of information which can be retained despite the inlaying of a logo. If the implementation does not erase the help data, the latter can in certain cases create more considerable losses of information than if they were absent, the use of erroneous motion vectors increasing the losses when the image stream is strongly compressed.

Other problems may arise when reusing help data envisaged for certain coding conditions in a completely different context. MPEG coding offers a range of use which varies from a few hundred Kb/s to 50 Mb/s. In order for the recoding to be able to benefit from the data to the maximum, the discrepancy between the recoding bit rate and the bit rate of the initial coding should not be too considerable. The use of certain coding parameters corresponding to a high bit rate, for example 20 Mb/s, makes coding at low bit rate, for example 2 Mb/s, impossible.

The aim of the invention is to afford a solution for reusing the help data selectively. For this purpose, the invention will adjoin, into the coded stream, at least one coding signature relating to the initial coding. The coding signature is included in the coded stream so as to be able to preserve a trace of information related to the first coding, this information not being contained explicitly in the coded stream representative of the images.

The subject of the invention is a method of coding a video image stream with a view to a subsequent recoding using a same type of code, the code being an image compression code with information loss which uses coding parameters, the said method providing, in a coded stream, coding parameters allowing the reconstruction of the video image stream, in which a coding signature is introduced into the coded stream and said signature is identified as a data item to be retained with a view to a subsequent recoding.

Preferably, the coding signature is representative of the coding constraints. The expression coding constraints should be understood to mean the parameters used to specify the extreme limits of coding.

SUMMARY OF THE INVENTION

The subject of the invention is also a method of decoding a coded video image stream including a coding signature with a view to a subsequent recoding using a same type of code, the code being an image compression code with information loss which uses coding parameters, the said method including in the decoded signal some of the coding parameters which are used during the previous coding with a view to a subsequent reuse of the said parameters. During decoding, the coding signature is incorporated into the decoded signal among the some of the coding parameters.

In order to correct the problems related to modifications of the stream after decoding, the invention would adjoin information relating to the integrity of the image. A decoding signature representative of the decoded image or of a zone of the decoded image is associated. The decoding signature is then placed in the decoded signal with the decoding parameters. Thus, for each image or image zone, the coder is capable of determining which information is still valid as a function of the decoding signature of the image. The introduction of a decoding signature representative of an image zone within the help data makes it possible to identify whether the zone is trustworthy and hence whether the help data are or are not valid.

According to a particular embodiment, the decoding signature is a word of n bits corresponding to a modular reduction of the sum of all the bits of the luminance and chrominance levels of the image zone. This type of signature is well known in the area of transmissions for having a signature representative of the integrity of a transmitted data packet and is better known by the name CRC (standing for Cyclic Redundancy Check).

Preferably, the image is divided into a plurality of image zones in such a way that each point of the image belongs to at least one zone, each zone having a decoding signature which is associated therewith. The dividing of the image into several zones makes it possible to have more accuracy as regards the modification of the associated image.

The invention also relates to a method of processing a video image stream obtained by the method of the invention, in which the image stream is slightly modified. After processing, a new calculation of decoding signature is performed so as to replace the decoding signatures associated with each image zone. The effecting of a new calculation of decoding signature makes it possible to render a processing device transparent. Only devices which modify the image very little should be rendered transparent. According to a particular embodiment, the processing rendered transparent is a sequence which comprises a recording of the image stream on magnetic medium followed by a reading of said stream from said magnetic medium.

The invention also relates to a method of recoding a video image stream previously decoded according to the decoding method which is the subject of the invention, in which the recoding is carried out with the aid of a compression code of the same type as the code used previously, and in which parameters of the previous coding are transmitted with the image stream, and in which, before undertaking the recoding, the coding and/or decoding signatures associated with the images of the said stream are verified so as to validate or to invalidate all or some of the parameters according to the said signatures.

According to a particular embodiment of the recoding method, the code effecting a coding per group of images so as to recode the images of a group of images on the basis of information intrinsic to the said group, all the parameters of the said group are invalidated and recalculated if the elements of the coding signature associated with the image stream are incompatible with certain recoding parameters.

Preferably, the recoding method uses a code which effects a coding per group of images, the said code coding the images of a group on the basis of information intrinsic to the said group, in which first coding parameters are specific to the group of images or to each image and second parameters are specific to image blocks of smaller size than an image. All the second parameters of this zone or dependent on this zone are invalidated and recalculated if a decoding signature associated with an image zone is not valid.

The invention will be better understood and other features and advantages will become apparent on reading the description which follows, the description making reference to the appended drawings among which:

BRIEF DESCRIPTION OF THE DRAWINGS

FIG. 1 represents a transmission chain according to the state of the art,

FIG. 2 represents a transmission chain according to the invention,

FIG. 9 represents an exemplary distribution of the image into image zones, FIG. 10 represents an exemplary decoding signature generating circuit according to the invention, FIG. 11 represents an exemplary decoding signature verification circuit according to the invention, and FIG. 12 represents the transmission format of an uncompressed image.

DETAILED DESCRIPTION

Figure 3:
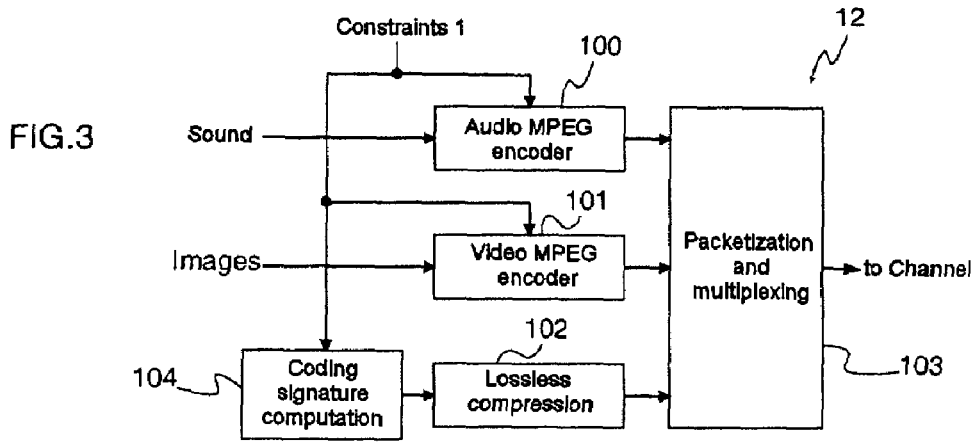
FIGS. 3 to 5 represent constituent elements of the transmission chain of FIG. 2, FIGS. 6 to 8 represent examples of a transmission chain according to another aspect of the invention.

FIG. 1 represents an image transmission chain according to the state of the art. An image sequence 1 is digitised then sent to a first coder 2, for example an MPEG type coder, so as to be compressed therein. The data representative of the image sequence 1 are then transmitted via a first transmission channel 3. A decoder 4 receives the data originating from the transmission channel 3 so as to decode them.

The decoder 4 is, for example, an MPEG type decoder which supplies on the one hand an image signal and on the other hand help data. With an explanatory aim, the image signal and the help data follow separate paths but can use the same physical transmission medium. Conventionally, the path used by the images is a high bit rate serial link where the images are rated at a speed permitting direct display, when the processing is carried out digitally.

A second coder 5 receives the image signal and the help data so as to perform a new coding in order to send the image sequence over a second transmission channel 6. As is known to the person skilled in the art, the help data serve to reuse the coding parameters used by the first coder 2 in the second coder 5. The first and second coders 2 and 5 are subject respectively to first constraints Constraints1 and to second constraints Constraints2 which specify the coding conditions (bit rate, type of bit rate, limitation of GOP structure, etc.) of each coder. As explained previously, there may be incompatibilities between the first constraints Constraints1 and the second constraints Constraints2.

FIG. 2 represents a modified transmission chain according to the invention. The first and second coders 2 and 5 are replaced with third and fourth coders 12 and 15. The decoder 4 is replaced with a decoder 14. A coding signature representative of the first constraints Constraints1 is sent through the channel 3 by the third coder 12. The decoder 14 identifies the coding signature and transmits it to the fourth coder 15 so that the latter can take account thereof during the recoding. The image signal, the help data and the coding signature follow three separate paths but may, obviously, use the same physical transmission medium.

FIG. 3 represents the design of the third coder 12. The third coder 12 is, for example, an MPEG type coder which comprises at least one audio encoder circuit 100, at least one video encoder circuit 101, at least one loss less compression circuit 102, and at least one packetizing and multiplexing circuit 103, the said circuits 100 to 103 being designed and devised according to known techniques of the MPEG standard. In this figure, the sound signal has been parted from the image signal since the MPEG standard makes provision to code them separately; however, for the figures in which the sound signal does not appear, the latter is regarded as included in the image signal.

As known from the state of the art, MPEG coding defines a coding technique permitting numerous possibilities of implementation. The first constraints Constraints1 define the limit within which the coding must be performed and are supplied for this purpose to the encoder circuits 100 and 101. The first constraints comprise one or more of the following parameters:

nature of the bit rate of the coded stream, that is to say whether it is a fixed or variable bit rate, this parameter depends on the conditions of use of the channel 3, value of the nominal or maximum stream, that is to say the bit rate requested of the coder, this parameter depends on the bandwidth of the channel 3, type of image group structure, whether it is a fixed or variable structure, nominal (for a fixed GOP structure) or maximum (for a variable GOP structure) number of images in an image group, nominal or maximum number of predicted images in an image group, maximum number of successive images predicted in a bi-directional manner in an image group, this parameter depends on the capabilities of the coder 12, maximum number of bits per group of images, conformity to a particular format, the particular format being definable for example in a standard so as to define one or more of the previous parameters, and optionally other parameters, with the help of a single word.

The constraint parameters are fixed by an operator as a function of the hardware environment of which he is knowledgeable and of the use which will normally be made of the coded stream. The problem with these parameters is that they are fixed at a given instant in a given context and that the parameters in question do not necessarily correspond to the use which will actually be made of the coded stream.

According to the invention, a signature computation circuit 104 receives the various coding constraints Constraints1 corresponding to an image signal so as to carry out a shaping according to a predefined format, the shaped constraint parameters corresponding to the coding signature. In order to make best use of the coding signature, the shaping should be carried out according to a standard recognized by all coder manufacturers. The coding signature computation circuit will supply the signature regularly to a loss less compression circuit 102, so that the coding signature is processed as user data. Regularly should be understood to mean at least once per GOP.

Figure 4:
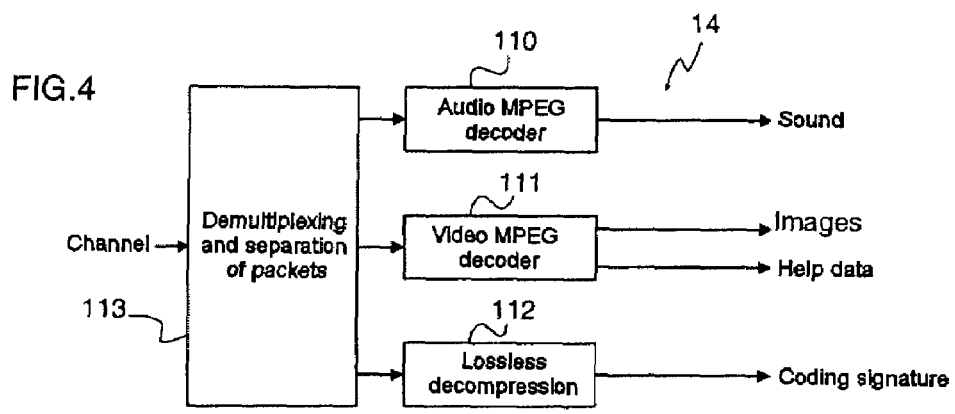

FIG. 4 diagrammatically represents the design of the decoder 14. The decoder 14 is, for example, an MPEG type decoder which comprises at least one audio decoder circuit 110, at least one video decoder circuit 111, at least one loss less decompression circuit 112, and at least one circuit for demultiplexing and separating the packets 113, the said circuits 110 to 113 being designed and devised according to known techniques of the MPEG standard. The person skilled in the art may note that the decoder 113 corresponds to a conventional decoder on which digital data which correspond to the coding signature are recovered. With the aim of clarity, the coding signature is represented on a medium independent of the other signals. As is known to the person skilled in the art, these coding signature digital data may be multiplexed with other digital data, for example the help data.

Figure 5:
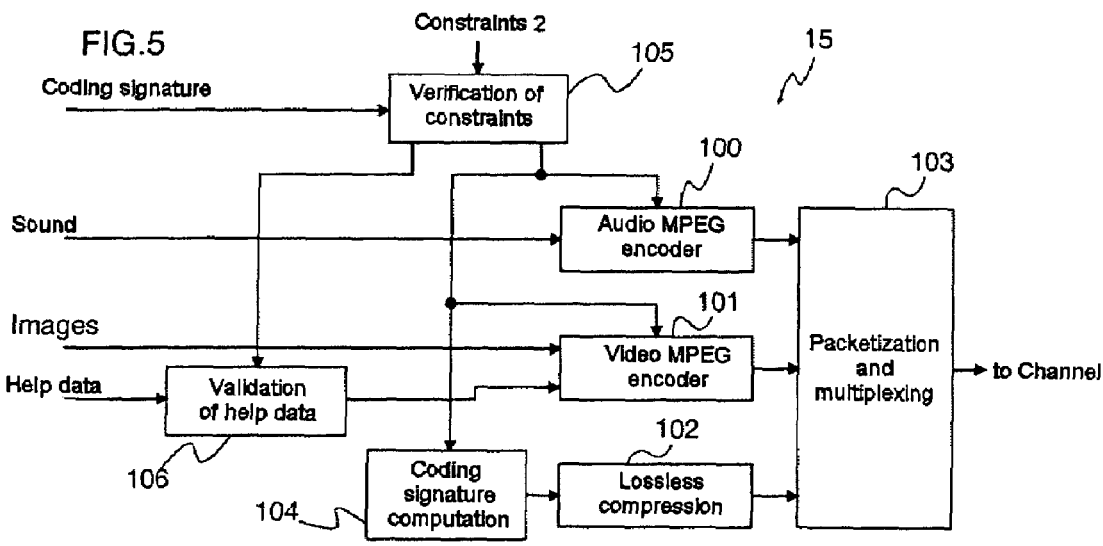

FIG. 5 represents the design of the fourth coder 15. The fourth coder 15 comprises circuits identical to the third coder 12: at least one audio encoder circuit 100, at least one video encoder circuit 101, at least one loss less compression circuit 102, at least one packetizing and multiplexing circuit 103, and a signature computation circuit 104. The coder 15 furthermore comprises a circuit for verifying the constraints 105 and a circuit for validating the help data 106.

The circuit for validating the constraints 105 receives on the one hand the second constraints Constraints2 and on the other hand the coding signature representative of the first constraints Constraints1. The circuit 105 performs a comparison of the first and second coding constraints so as to determine whether the help data are or are not usable. The comparison is not made identically. By way of example, if a stream reduction is performed with a factor of 3 or greater, the help data are generally no longer suited to the recoding constraint and their use renders the recoding of low performance or even impossible. Other parameters may also indicate a coding incompatibility, if the maximum number of successive B images of the first constraints is greater than the maximum number of successive B images that can be managed by the coder 15, the help data cannot be reused. As far as the nature of the stream is concerned, the help data can be reused if the change of bit rate so permits. The type of structure as well as the number of images per GOP may differ within certain limits if the bit rate ratio so permits.

As a function of the comparison of the constraints, the circuit for verifying the constraints 105 will supply a help data validation information item. By way of example, the validation information item may be of binary type to validate or cancel all the help data. According to another example, the cancellation of the help data may be more selective, by giving the possibility of retaining the I, P or B type of each image.

The circuit for verifying the constraints supplies coding constraints information which corresponds either to the second constraints, or to the first constraints, or else to a mixture of the first and second constraints. The coding constraints information will be used for the coding and sent to the signature computation circuit 104 which will compute a coding signature representative of the constraints of the coding effected.

A second aspect of the invention, relating to a decoding signature, will now be described. The principle of the decoding signature is to verify the integrity of the image before reusing the help data pertaining thereto.

FIG. 6 represents a part of an image transmission chain. The decoder 14 receives the data originating from the transmission channel 3 so as to decode them. Preferably, the decoder 14 is an MPEG type decoder as described in FIG. 4. To simplify the drawing, the help data and the coding signature (which are also denoted DA+SC) are represented on one and the same path. Conventionally, the images and the help data are synchronized. A fourth coder 15 receives the image signal and the help data so as to perform a new coding in order to send the image sequence over a second transmission channel 6, as explained previously.

In order to be able to verify the integrity of the image, a decoding signature generating circuit 7 has been added at the output of the decoder 14. The generating circuit supplies a decoding signature representative of the information contained in the image. A decoding signature verification circuit 8 receives the image signal and the signature signal and supplies the fourth coder 15 with a signature validity information item VALID so that the former can take account of or ignore the help data.

The person skilled in the art will understand that the benefit of such an invention arises when an item of equipment 9 or 10 is inserted between the decoder 14 and the fourth coder 15, as shown in FIGS. 7 and 8. By way of example, the item of equipment 9 of FIG. 7 may be a video mixing table. According to the operation carried out, the output image signal may or may not be identical to the input image signal. The verification circuit 8 will enable the fourth coder 15 to identify the modified images or image zones. As a function of the modifications made, the coder will therefore be able to reuse all or some of the help data.

The case of a mixing table corresponds to a specific case where a piece of reporting is edited in the studio and for which much of the image sequences remains unchanged. On the other hand, when the image is touched up, the verification circuit indicates that a zone of the image has changed and only some of the help data is reusable.

FIG. 8 corresponds to the use of an item of equipment 10 which may be regarded as transparent at coding level. As item of transparent equipment should be regarded devices which act on the image in a very weak manner and which do not have the aim of modifying the image. By way of example, the item of equipment 10 is a studio storage device, for example a recorder in the DVCPRO format. The studio storage devices using tapes generally carry out a compression of the digital signal with a very slight loss which can be neglected relative to the losses engendered by the MPEG-like transmission coding.

In order to render the item of equipment 10 completely transparent, an additional generating circuit 7b should be added which recalculates the decoding signatures from the image signal output by the item of equipment 10. Thus, the few slightly modified pixels in an image do not invalidate the decoding signatures.

According to a preferred variant, the item of equipment 10 uses video image compression also according to the MPEG2 standard. The item of equipment 10 can then verify the coding signature SC emanating from the previous coding and verifies that the losses which it introduces are actually negligible relative to the quality of the image resulting from the previous coding.

In the preferred example, the generating circuit 7 chops the image into twelve image zones Z1 to Z12, as is represented in FIG. 9. If a decoding signature relating to one of the zones is invalidated, then the coder deactivates the help data relating to the said zone. By way of example for MPEG coding, the coder will ignore all the motion vectors corresponding to the macroblocks of the said zone as well as all the motion vectors of the past or future images which make reference to the said zone.

If more than half of the decoding signatures of an image are invalidated, then the coder also deactivates the parameters specific to the image. In MPEG coding, the quantization step sizes and the DCT weighting matrices may be parameters specific to each image and hence be invalidated if the number of modified zones is considerable.

As far as the parameters specific to the image sequence or to the group of images are concerned, these parameters should be retained even if the images change. Specifically, the (I, P and B) image type information may be retained despite the modifications since the use of a B image as I image is a potential source of loss of image information.

FIG. 10 represents a preferred embodiment of the generating circuit 7. The generating circuit 7 comprises four calculation circuits 20 each having an input and an output, the inputs being linked together and receiving the image signal. Each of the calculation circuits 20 is a known type of control key calculation circuit which performs a modular reduction of the data entering the said circuits. The calculation circuits 20 are activated only when the image data present in the image signal correspond to the zone whose decoding signature they perform. When all the image data present in the various lines of a zone have been entered into a calculation circuit 20, the said circuit 20 outputs the corresponding decoding signature in series. A multiplexer 21 selects one of the calculation circuits so as to multiplex the decoding signatures on the signature signal.

FIG. 11 represents a preferred embodiment of the signature verification circuit 8. The verification circuit 8 comprises a calculation structure comprising four calculation circuits 22 and a multiplexer 23 which undertakes a function identical to the function of the generating circuit 7. A gate 24 of Exclusive-OR type with two inputs receives on the one hand the signal output by the multiplexer 223 and, on the other hand, the signature signal originating from a generating circuit 7 so as to carry out a comparison between the signals and to supply a VALID signal representative of the integrity of the image zones, the VALID signal being active when a difference appears between the transmitted decoding signature and the recalculated decoding signature.

A great many variants of the invention are possible. According to one variant, the coding and decoding signatures are included in the image signal. FIG. 12 represents an image transmitted according to a format permitting direct display. As is known by the person skilled in the art, the image transmitted comprises an actual image part and one or more image parts VBI and HBI added for synchronisation. The added image parts VBI and HBI serve to allow a cathode ray tube spot time to return to the origin of a line (horizontal interval or HBI) or to the origin of the screen (vertical interval or VBI). The coding and decoding signatures are included in the added intervals of the image so that the decoding signatures remain synchronous with the image.

Another variant consists in including the coding and decoding signature generation and verification circuits in the decoding and coding circuits respectively. At the level of the structure, the architecture of the coding and decoding circuits comprising a plurality of microprocessors coupled with memories, it is sufficient to modify the program installed in the circuits in order to include the coding and decoding signature generating circuit or signature verification circuit function. Moreover, the horizontal interval and the vertical interval of the image are already used for the help data and make it possible to include the signatures signal in the said intervals.

What is claimed is:

1. Method of decoding a video image stream arising in the form of a video image coded stream comprising a coding signature representing first encoding constraints and coding parameters allowing the reconstruction of the video image stream, said coding signature being identified in said coded stream as a data item to be retained with a view to a subsequent recoding, said method of decoding comprising the steps of:
   decoding said video image coded stream into a decoded signal, using a video decoder;
   including in the decoded signal some of the coding parameters which are used during the previous coding with a view to a subsequent reuse of said parameters;
   incorporating, during decoding step, the coding signature into the decoded signal among the some of the coding parameters,
   wherein the method of decoding further comprises the steps of:
   associating, during the decoding step, at least one decoding signature representative of at least one zone of each decoded image of the stream, said decoding signature being a word of n bits corresponding to a modular reduction of the sum of all the bits of the luminance and chrominance levels of the image zone; and
   placing this signature in the decoded signal with the coding parameter.

2. Method according to claim 1 comprising a step of dividing the image into a plurality of image zones in such a way that each point of the image belongs to at least one zone, each zone having a decoding signature which is associated therewith.

3. Method of recoding a video image stream arising in the form of a video image coded stream comprising a coding signature representing first encoding constraints and coding parameters allowing the reconstruction of the video image stream, said coding signature being identified in said coded stream as a data item to be retained with a view to a subsequent recoding,
   in which the recoding is carried out with the aid of a compression code of the same type as the code used previously, the code being an image compression code with information loss which uses coding parameters, and in which parameters of the previous coding are transmitted with the image stream; comprising the steps of:
   decoding said video image coded stream into a decoded signal, using a video decoder;
   including in the decoded signal some of the coding parameters which are used during the previous coding with a view to a subsequent reuse of said parameters;
   incorporating, during decoding step, the coding signature into the decoded signal among the some of the coding parameters;
   verifying the coding signatures associated with the images of the said stream so as to validate or to invalidate all or some of the parameters according to the said signatures; and
   recoding said video image stream, using a video encoder.

4. Method according to claim 3, wherein the coding constraints comprise one or more of the following parameters:
   nature of the bit rate of the coded stream,
   value of the nominal or maximum stream,
   type of image group structure,
   nominal or maximum number of images in an image group,
   normal or maximum number of predicted images in an image group,
   maximum number of successive images predicted in a bi-directional manner in an image group,
   maximum number of bits per image group,
   conformity to a particular format.

5. Method according to claim 3, in which, during recoding step, said video image stream is coded per group of images, the images of a group of images being coded on the basis of information intrinsic to the said group, wherein, when the elements of the coding signature associated with the image stream are incompatible with recoding parameters, then all the parameters of the said group are invalidated and recalculated.

6. Method according to claim 3, in which, during recording step, said video image stream is coded per group of images, the images of a group being coded on the basis of information intrinsic to the said group, in which first coding parameters are specific to the group of images or to each image and second parameters are specific to image blocks of smaller size than an image,
wherein when a decoding signature associated with an image zone is not valid, then all the second parameters of this zone or dependent on this zone are invalidated and recalculated.

7. Method of recoding a video image stream previously coded according to the steps of:
encoding said video image stream into a coded stream so as to respect first encoding constraints, using a video encoder;
inserting into said coded stream coding parameters allowing the reconstruction of the video image stream,
introducing a coding signature into the coded stream, said signature representing said first encoding constraints, and
identifying said signature as a data item to be retained with a view to a subsequent recoding;
and further decoded according to the steps of:
decoding said video image coded stream into a decoded signal, using a video decoder;
including in the decoded signal some of the coding parameters which are used during the previous coding with a view to a subsequent reuse of said parameters;
incorporating, during decoding step, the coding signature into the decoded signal among the some of the coding parameters;
in which the recoding is carried out with the aid of a compression code of the same type as the code used previously, the code being an image compression code with information loss which uses coding parameters, and in which parameters of the previous coding are transmitted with the image stream, comprising the steps of:
verifying the coding signatures associated with the images of the said stream so as to validate of to invalidate all or some of the parameters according to the said signatures; and
recoding said video image stream, using a video encoder.

8. Method according to claim 7, in which, during recoding step, said video image stream is coded per group of images, the images of a group of images being coded on the basis of information intrinsic to the said group, wherein, when the elements of the coding signature associated with the image stream are incompatible with recoding parameters, then all of the parameters of the said group are invalidated and recalculated.

9. Method according to claim 7, in which, during recoding step, said video image stream is coded per group of images, the images of a group being coded on the basis of information intrinsic to the said group, in which first coding parameters are specific to the group of images or to each image and second parameters are specific to image blocks of smaller size than an image,
wherein when a decoding signature associated with an image zone is not valid, then all the second parameters of this zone or dependent on this zone are invalidated and recalculated.

10. Method according to claim 7, wherein the coding constraints comprise one or more of the following parameters:
nature of the bit rate of the coded stream,
value of the nominal or maximum stream,
type of image group structure,
nominal or maximum number of images in an image group,
nominal or maximum number of predicted images in an image group,
maximum number of successive images predicted in a bi-directional manner in an image group,
maximum number of bits per image group,
conformity to a particular format.

11. Method of decoding a video image stream with a view to a subsequent recoding using a same type of code, the code being an image compression code with information loss which uses coding parameters, said video stream being previously coded according to the steps of:
encoding said video image stream into a coded stream so as to respect first encoding constraints, using a video encoder;
inserting into said coded stream coding parameters allowing the reconstruction of the video image stream,
introducing a coding signature into the coded stream, said signature representing said first encoding constraints, and
identifying said signature as a data item to be retained with a view to a subsequent recoding;
said method of decoding comprising the steps of:
decoding said video image coded stream into a decoded signal, using a video decoder;
including in the decoded signal some of the coding parameters which are used during the previous coding with a view to a subsequent reuse of said parameters;
incorporating, during decoding step, the coding signature into the decoded signal among the some of the coding parameters,
wherein the method of decoding further comprises the steps of:
associating, during decoding step, at least one decoding signature representative of at least one zone of each decoded image of the stream, said decoding signature being a word of n bits corresponding to a modular reduction of the sum of all the bits of the luminance and chrominance levels of the image zone; and
placing this signature in the decoded signal with the coding parameter.

12. Method according to claim 11, comprising a step of dividing the image into a plurality of image zones in such a way that each point of the image belongs to at least one zone, each zone having a decoding signature which is associated therewith.

* * * * *